(12) United States Patent
Glusker

(10) Patent No.: US 11,346,426 B1
(45) Date of Patent: May 31, 2022

(54) CABLE ROTATION APPARATUS

(71) Applicant: AMAZON TECHNOLOGIES, INC., Seattle, WA (US)

(72) Inventor: Mark John Glusker, San Francisco, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 314 days.

(21) Appl. No.: 16/042,754

(22) Filed: Jul. 23, 2018

(51) Int. Cl.
| *F16G 11/10* | (2006.01) |
| *B25J 9/00* | (2006.01) |
| *F16G 11/06* | (2006.01) |
| *B25J 9/10* | (2006.01) |

(52) U.S. Cl.
CPC .......... *F16G 11/106* (2013.01); *B25J 9/0027* (2013.01); *B25J 9/1045* (2013.01); *F16G 11/06* (2013.01)

(58) Field of Classification Search
CPC ....... F16G 11/106; F16G 11/06; B25J 9/1045; B25J 9/0027; H01R 35/02; H01R 35/025
See application file for complete search history.

(56) References Cited

U.S. PATENT DOCUMENTS

| 2,696,610 | A | * | 12/1954 | Turley | G01S 7/02 |
| | | | | | 342/176 |
| 3,160,362 | A | * | 12/1964 | Weber | B65H 75/486 |
| | | | | | 242/577 |
| 4,766,775 | A | * | 8/1988 | Hodge | B25J 9/08 |
| | | | | | 74/490.01 |
| 4,903,536 | A | * | 2/1990 | Salisbury, Jr. | B25J 9/046 |
| | | | | | 414/7 |
| 5,207,114 | A | * | 5/1993 | Salisbury, Jr. | B25J 9/046 |
| | | | | | 414/7 |
| 5,828,813 | A | * | 10/1998 | Ohm | B25J 3/04 |
| | | | | | 700/260 |
| 9,545,727 | B1 | * | 1/2017 | Shamlian | B25J 15/0009 |
| 2011/0201471 | A1 | * | 8/2011 | Cline | F16H 37/06 |
| | | | | | 475/220 |
| 2018/0111703 | A1 | * | 4/2018 | Hensley | H01Q 1/1235 |
| 2019/0366533 | A1 | * | 12/2019 | Ben-Tzvi | B25J 17/0241 |
| 2020/0121478 | A1 | * | 4/2020 | Woge | B25J 9/1633 |

* cited by examiner

*Primary Examiner* — William A. Rivera
(74) *Attorney, Agent, or Firm* — Lindauer Law, PLLC

(57) ABSTRACT

An extensible mast allows a payload to be supported at a distance from a supporting device. The payload may be connected via a cable to one or more components in the supporting device. A cable rotation apparatus allows a cable to rotate during dispensation of the cable, such as during extension or retraction of the extensible mast, while minimizing strain on the cable. The apparatus comprises a stationary spool, a furling core, and a rotating spool. A beveled gear on each of the spools engages a pair of beveled gears in the furling core. As the rotating spool rotates with respect to the stationary spool, the furling core rotates at one-half the speed and the cable is dispensed from an opening in the rotating spool. The furling core incorporates a guide wheel that maintains an orderly transfer of the cable from one spool to another.

20 Claims, 6 Drawing Sheets

CABLE ROTATION APPARATUS

BACKGROUND

A device such as a robot may have an extensible portion. The extensible portion may house electronics or other components that are connected via one or more cables to the device.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
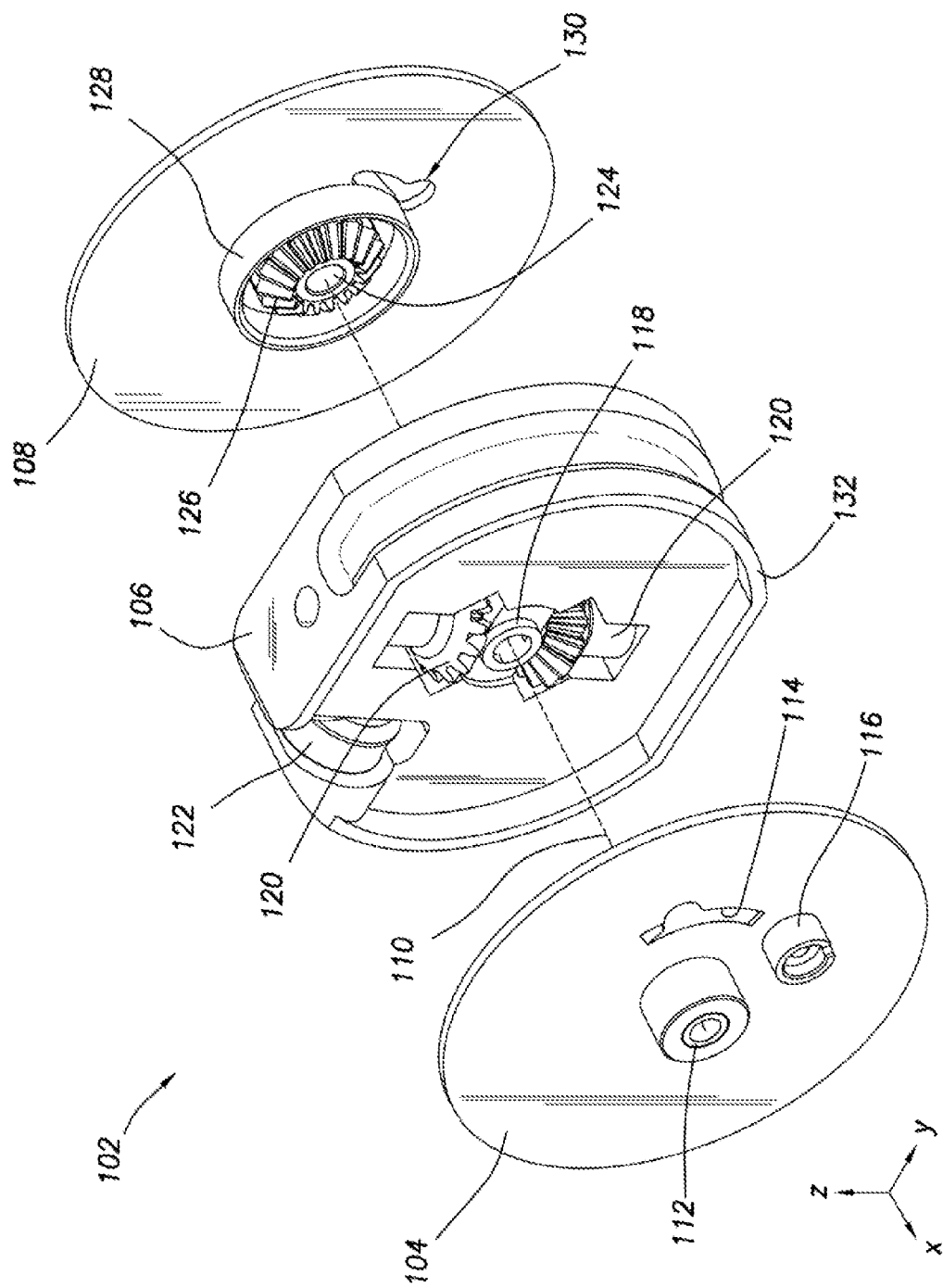
FIG. 1 illustrates an exploded view of a cable rotation apparatus from a first point of view, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A variety of devices may utilize a cable to connect components. The cable may include one or more electrical wires, waveguides, coaxial cables, flexible printed circuits, and so forth. For example, a cable comprising a pair of coaxial cables may provide a connection between a camera and a circuit board. The cable may provide electrical power to the camera, transfer control signals to the camera, transfer signals from the camera to the circuit board, and so forth. In some implementations, the cable may comprise tubing to transfer gasses or liquids.

In some implementations, the distance between the connected components may change during use. For example, a supporting device such as a robot, remotely operated vehicle, or autonomous vehicle may utilize an extensible mast, arm, or other device that is able to reposition a payload with respect to the supporting device. Continuing the example, the robot may include an extensible mast that is able to extend generally upward. Atop the extensible mast may be a payload such as sensors, output devices, and so forth. By using the extensible mast, the robot is able to reposition the payload. For example, the robot may extend the mast to allow the camera in the payload to acquire images of what is on a countertop, to look out a window, and so forth.

The extensible mast may be driven to extend or retract using a variety of mechanisms. For example, during the process of extending the mast and retracting the mast, electric motors may be used to move the mast. As the mast extends, the distance from one end of the mast to the other increases. Likewise, as the mast retracts, the distance from one end of the mast to the other decreases. To maintain connectivity and avoid strain on the cable that could result in failure of the cable, the length of the cable present in the mast changes. As the mast is extended, a greater length of cable is used than when the mast is retracted.

Traditional techniques to account for this change in cable length during extension or retraction may involve placement of the cable external to the mast or other supporting structure. For example, the cable may be coiled around the mast. However, this exposes the cable to the external environment, which may result in the cable being snagged, which could result in damage to users or the device, and also increases the length of cable used, which may result in undesired signal attenuation. In another example, the cable may be stored and deployed from a spool located near one end of the mast. However, in a conventional system this necessitates the use of some sort of rotary connector that allows for a transition from the rotating spool to the fixed components in the supporting structure.

In some situations, rotary connectors may introduce several drawbacks. For example, rotary electrical connectors are typically expensive parts to purchase, increasing production cost of the overall system. Rotary connectors may involve moving parts that are in contact with one another, which wear over time. Impedance of the rotary connector may change over time due to the wear. For example, as brushes, spring contacts, and so forth within the rotary connector move past one another, they may become worn, changing the electrical impedance over time. This may result in undesired operation, such as a failure. Rotary connectors may also introduce noise during operation. For example, electrical noise resulting from the motion of parts in the rotary connector may distort a waveform of a signal passing through the rotary connector.

Described in this disclosure is a cable rotation apparatus that allows for a first end of the cable to remain fixed, such as when attached to a circuit board, while a second end of the cable is free to move.

In one implementation, the cable rotation apparatus comprises a stationary spool, a rotating spool, and a furling core. The stationary spool includes a first center bore, allowing the stationary spool to accept an axle. A first spool gear comprising a bevel ring gear is arranged around the first center bore on an inner face of the stationary spool that faces the furling core. A first drum extends from a surface of the inner face of the stationary spool towards the furling core. For example, the first drum may comprise a cylindrical feature that extends from the inner face and is centered on the first center bore. A first aperture in the stationary spool permits entry of the end of the cable that is fixed. A cable retention feature on an outer face of the stationary spool may be used to retain the fixed end of the cable.

The rotating spool includes a second center bore, that may also accept the axle. A second spool gear comprising a bevel ring gear is arranged around the second center bore on an inner face of the rotating spool that faces the furling core. A second drum extends from a surface of the inner face of the rotating spool towards the furling core. For example, the second drum may comprise a cylindrical feature that extends from the inner face and is centered on the second center bore. A second aperture in the rotating spool permits exit of the end of the cable that may rotate. An engagement feature on an outer face of the rotating spool may be used to engage a spool face, resulting in a supply spool that stores the portion of the cable that may be extended or retracted.

The furling core includes a third center bore, that may also accept the axle. As a result, the first, second, and third center bores are aligned along a central axis. The furling core may include a first furling gear and a second furling gear. The first furling gear and the second furling gear may comprise beveled gears that are arranged along a single axis of rotation that is perpendicular to the central axis extending through the first, second, and third center bores. In one implementation, the apex of the first furling gear and the apex of the second furling gear may both be proximate to the central axis. When assembled, the first furling gear engages the first spool gear and the second spool gear while the second furling gear engages the first spool gear and the second spool gear. In this arrangement, the rotation of the furling core is constrained to some fraction of the rotation of the rotating spool with respect to the stationary spool. For example, one revolution of the rotating spool would result in a one-half revolution of the furling core.

The furling core may also include a guide feature, such as a guide wheel. The guide wheel has a wheel face that extends from at least proximate to the inner face of the stationary spool to at least proximate to the inner face of the rotating spool.

As described above, the rotation of the rotating spool and the furling core are constrained with respect to one another and the stationary spool. During rotation, the cable is transferred between the stationary spool and the rotating spool. The guide wheel facilitates this transition by directing the cable through a pair of bends. For example, as the cable approaches a first side of the guide wheel, the cable undergoes a slight twist or rotation in two orthogonal planes. As the cable leaves a second side of the guide wheel, the cable undergoes another twist or rotation in the two orthogonal planes in the opposite direction. For example, as viewed from overhead the cable forms a "U" shape with the guide wheel within the bottom of the "U". As a result, the cable transitions from being unwound from a first spool to being wound on a second spool in the same direction. During rotation, the length of cable that is retained within the apparatus remains substantially the same.

This apparatus eliminates the use of a rotary connector, and the associated drawbacks. The apparatus allows for the use of a contiguous cable from the stationary end ultimately to the payload at a far end that changes distance. As a result, from one end of the cable to the other, signal loss, impedance changes, and noise are reduced. Additionally, wear of the moving parts in the cable rotation apparatus does not adversely impact the cable passing through the cable rotation apparatus. The cable rotation apparatus is also able to operate using cables with non-circular cross sections, such with flat cables. As a result, the apparatus provides several benefits during operation.

Illustrative System

FIG. 1 illustrates an exploded view of a cable rotation apparatus (apparatus) 102 from a first point of view, according to some implementations. For clarity, the cable is not depicted.

The apparatus 102 may comprise a rotating spool 104, furling core 106, and a stationary spool 108. In one implementation, the rotating spool 104, the furling core 106, and the stationary spool 108 are arranged along a central axis 110. In another implementation, the central axis 110 may intersect the stationary spool 108 at another location that is not central to the stationary spool 108.

The rotating spool 104 comprises a center bore 112. The center bore 112 may comprise a bushing, bearing, and so forth. For example, the center bore 112 may include a ball bearing or roller bearing to reduce the friction of rotation of the rotating spool 104 about an axle arranged along the central axis 110. During operation, the rotating spool 104 rotates about the central axis 110. An aperture 114 in the rotating spool 104 provides an opening from an inner surface of the rotating spool 104 to an outer surface. An engagement feature 116 is shown that is used to engage a supply spool (not shown). When the supply spool is engaged to the rotating spool 104, the two rotate simultaneously. The supply spool is used to store the cable that is to be dispensed, such as during extension of an extensible mast.

The furling core 106 may comprise a center bore 118. The center bore 118 may comprise a bushing, bearing, and so forth. During operation, the furling core 106 rotates about the central axis 110.

The furling core 106 comprises two furling gears 120. The furling gears 120 comprise beveled gears that are arranged along a single axis of rotation that is perpendicular to the central axis 110. A beveled gear is an angled gear. The apex of the beveled gear is the distance from an imaginary point of a cone that extends just over the teeth. For example, the apex side of a beveled gear is the side of the gear in which the diameter measured across the teeth is least.

As illustrated in FIG. 1, the apex of each of the furling gears 120 is proximate to the center bore 118. Each of the furling gears 120 is able to rotate along the single axis of rotation that they share in common. At any given instant during rotation, the furling gears 120 as shown here will rotate in opposite directions.

The furling core 106 may include a guide feature, such as a guide wheel 122. The guide wheel 122 extends from a first side of the furling core 106 that is proximate to the inner face of the rotating spool 104 to a second side of the furling core 106 that is proximate to the inner face of the stationary spool 108. In some implementations, the guide wheel 122 may have a diameter that is greater than a thickness of the furling core 106. For example, the edges of the guide wheel 122 may extend beyond the inner surface of the furling core 106. In one implementation, the axis of rotation of the guide wheel 122 may be perpendicular to the single axis of rotation of the furling gears 120.

In other implementations, the guide feature may comprise one or more rollers, a fixed piece of material, and so forth. For example, the guide feature may comprise a plastic or ceramic, such as Teflon or glass, that exhibits a relatively low coefficient of friction.

The furling core 106 may include one or more walls 132 or other features that extend from the surface of the furling core 106 towards the spools. For example, as shown in FIG.

1, a first wall 132 extends from a first side of the furling core towards the inner face of the rotating spool 104. Likewise, a second wall 132 extends from a second side of the furling core towards the inner face of the stationary spool 108. During operation, the cable is maintained within the space between the inner surface of the spools and the furling core 106 and the walls 132.

The stationary spool 108 includes a center bore 124. The center bore 124 may comprise a bushing, bearing, and so forth. In some implementations, the center bore 124 may extend all the way through the stationary spool 108, or not.

The stationary spool 108 includes a spool gear 126. In one implementation illustrated here, the spool gear 126 comprises a bevel ring gear arranged around the center bore 124 on the inner face of the stationary spool 108. The apex of the spool gear 126 is proximate to the furling core 106.

A drum 128 extends from a surface of the inner face of the stationary spool 108 towards the furling core 106. For example, the drum 128 may comprise a cylindrical feature that extends from the inner face and is centered on the center bore 124. In another example, a series of fingers or posts may extend, rather than a solid wall.

An aperture 130 in the stationary spool 108 provides an opening from an outer surface of the stationary spool 108 to an inner surface of the stationary spool 108. The portion of the cable within the aperture remains fixed. For example, the cable may be attached to a circuit board and then pass through the aperture 130 into the apparatus.

Figure 2:
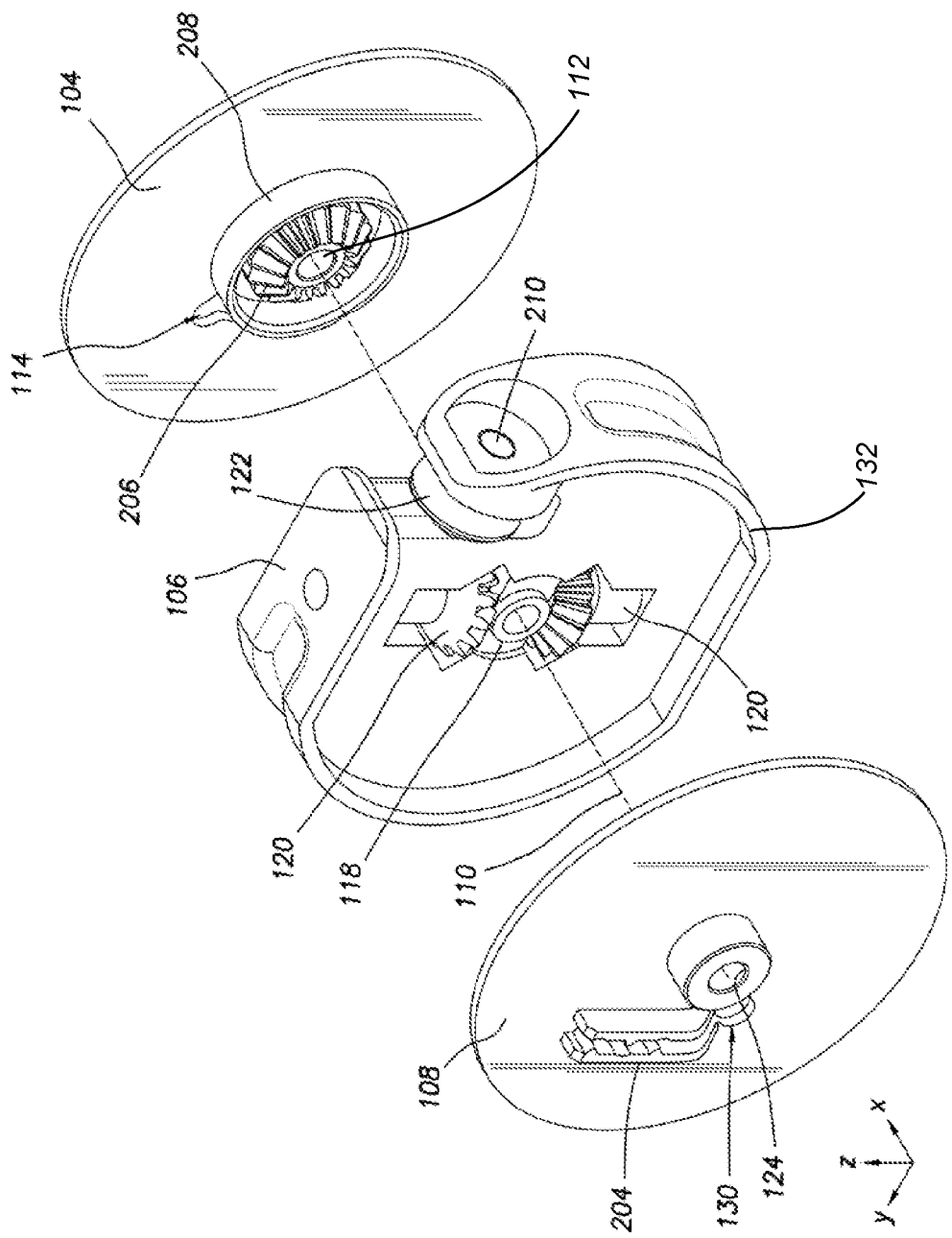
FIG. 2 illustrates an exploded view of the cable rotation apparatus of FIG. 1 from a second point of view, according to some implementations.

FIG. 2 illustrates an exploded view of the cable rotation apparatus of FIG. 1 from a second point of view, according to some implementations. For clarity, the cable is not depicted.

In this view, an outer surface of the stationary spool 108 is visible. Extending from the outer surface, or affixed thereto, is cable retention feature 204. The cable retention feature 204 may be used to mechanically engage at least a portion of the cable to minimize or prevent movement of the cable between the cable retention feature 204 and a fixed component, such as a circuit board. Also visible is the aperture 130 in the stationary spool 108 through which the cable passes to an interior of the apparatus.

An inner surface of the rotating spool 104 is visible.

The rotating spool 104 includes a spool gear 206. In one implementation illustrated here, the spool gear 206 comprises a bevel ring gear arranged around the center bore 112 on an inner face of the rotating spool 104. The apex of the spool gear 206 is proximate to the furling core 106.

The furling core 106 is shown with the guide wheel 122. A guide wheel axle 210 is also shown, retaining the guide wheel 122 to a body of the furling core 106. The furling gears 120 of the furling core 106 are also shown.

A drum 208 extends from a surface of the inner face of the rotating spool 104 towards the furling core 106. For example, the drum 208 may comprise a cylindrical feature that extends from the inner face and is centered on the center bore 112. In another example, a series of fingers or posts may extend, rather than a solid wall.

The aperture 114 in the rotating spool 104 provides an opening from the inner surface of the rotating spool 104 to the outer surface of the rotating spool 104. The portion of the cable at this end may be rotated, such as wound around a spool. For example, the cable after exiting may be wrapped around a supply spool prior to dispensation during extension of a mast.

In some implementations, the gears may comprise straight bevel gears having a conical pitch surface and teeth that are straight and taper towards an apex of each gear. The spool gear 126 on the stationary spool 108 and the spool gear 206 on the rotating spool 104 may each have the same number of teeth. Likewise, the furling gears 120 may each have the same number of teeth. In some implementations, the number of teeth present on the spool gears 126 and 206 may be the same as the number of teeth present on the furling gears 120.

As a result of the interaction between the gears, as the rotating spool 104 rotates about the central axis 110 with respect to the stationary spool 108, the furling core 106 rotates at some fractional rate. For example, for every single revolution of the rotating spool 104 the furling core 106 may rotate one-half a revolution.

It is understood that in other implementations other gear arrangements may be used. For example, the spool gears 126 and 206 may be arranged along an outer edge of the respective spools, near a perimeter of the inner surfaces of the respective spools, while the furling gears 120 are arranged with their respective apexes pointing radially outward from the central axis 110.

The apparatus may comprise components that are produced using additive printing (such as 3D printing), injection molding, milling, casting, and so forth. For example, the gears and spools may comprise plastic, as the forces exerted upon them during operation are relatively low.

Figure 3:
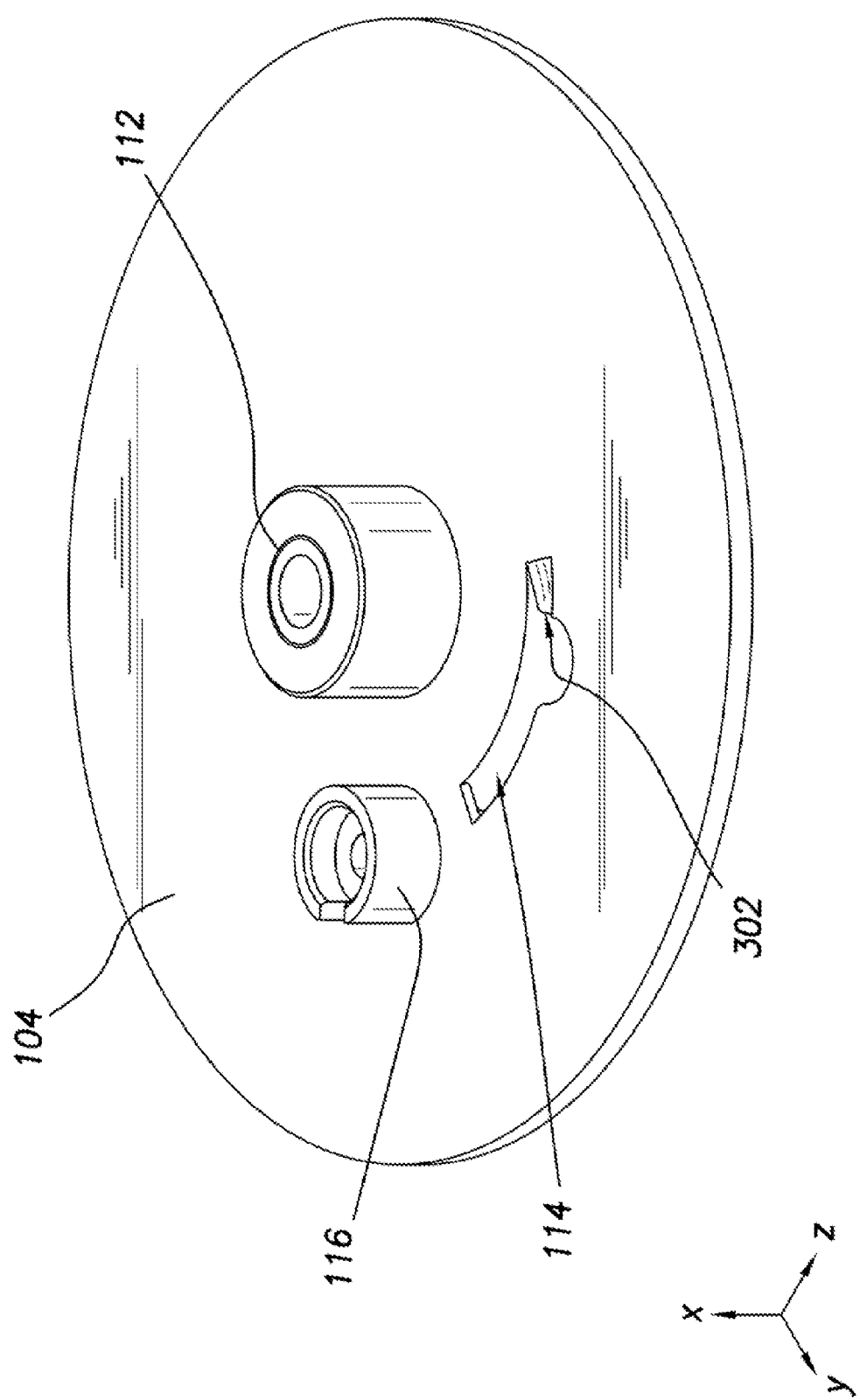
FIG. 3 illustrates a view of a rotating spool of the cable rotation apparatus of FIG. 1, according to some implementations.

FIG. 3 illustrates a view of the rotating spool 104 of the cable rotation apparatus of FIG. 1, according to some implementations. In this view, the outer surface of the rotating spool 104 is visible. The center bore 112 and engagement feature 116 are shown extending from the outer surface of the rotating spool 104. The aperture 114 is also shown. Within the aperture a ramp 302 is shown. The ramp 302 may be used to increase the surface area of the rotating spool 104 that comes into contact with the cable, reducing the contact pressure between the cable and the rotating spool 104 as the cable transitions from the exterior of the apparatus 102 to the interior of the apparatus 102.

Figure 4:
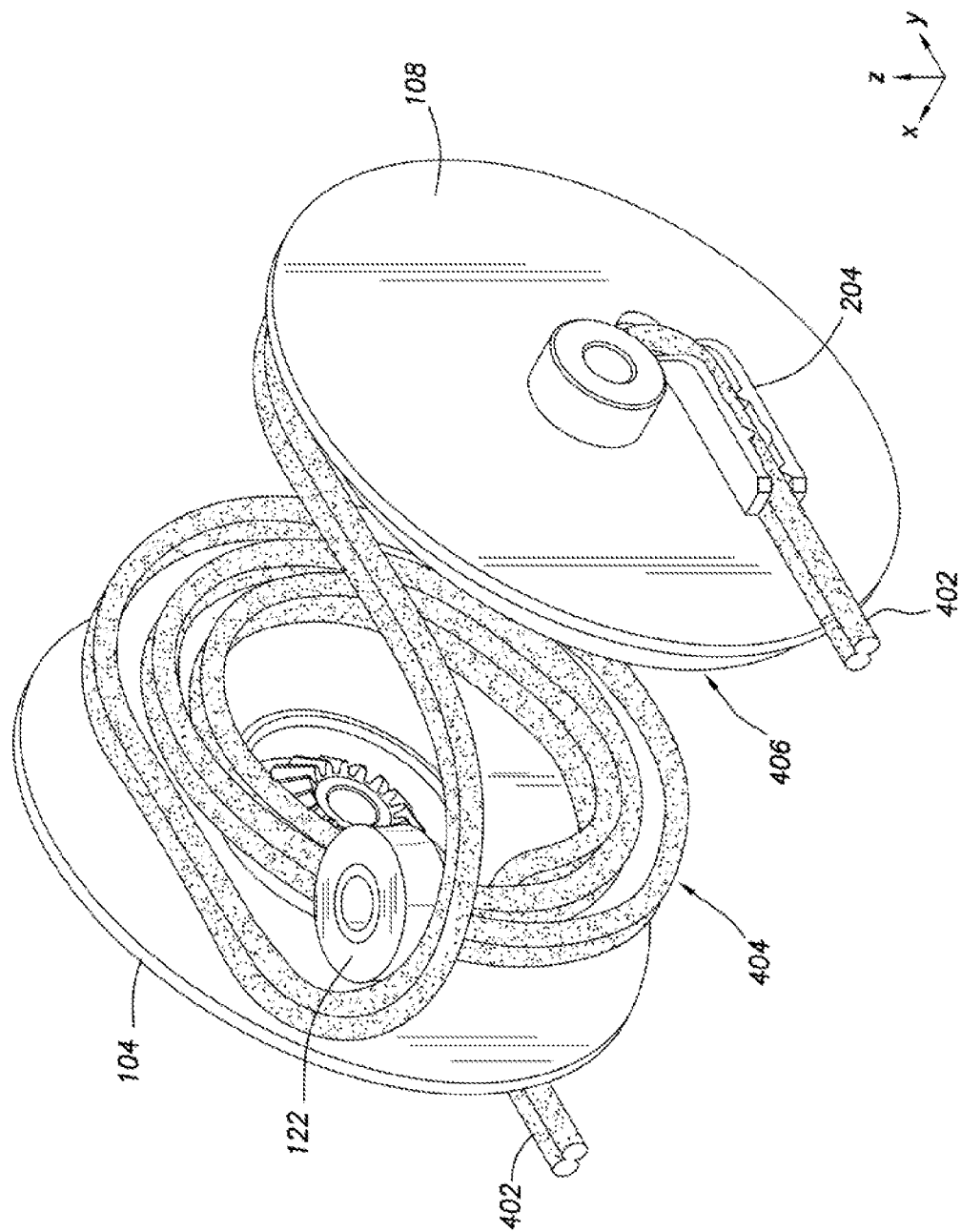
FIG. 4 illustrates routing of a cable through the cable rotation apparatus, according to some implementations.

FIG. 4 illustrates routing of a cable through the apparatus 102, according to some implementations. In this illustration the rotating spool 104, the stationary spool 108, and the guide wheel 122 are depicted. The furling core 106 has been omitted and the distance between the spools has been exaggerated for clarity.

Shown here is the cable 402. In this illustration, the cable 402 comprises a pair of coaxial cables that have been joined to form a flat cable. In other implementations, the cable 402 may comprise other types of conductors, waveguides, tubes, and so forth.

Within the body of the apparatus 102, in the space between the furling core 106 and the inner surfaces of the rotating spool 104 and the stationary spool 108, respectively, a length of cable 402 is stowed in a first coil 404 and a second coil 406. During operation, as the rotating spool 104 and the furling core 106 rotate with respect to the central axis 110, the cable 402 within the apparatus 102 is transferred between the first coil 404 and the second coil 406, with the direction of transfer determined by the direction of rotation.

The cable 402 remains fixed at the first end located at the stationary spool 108. For example, the first end may connect to a connector on a circuit board. Meanwhile, during use the rotating spool 104 rotates, and with it the second end of the cable 402 also rotates. The pair of twists or rotations of the cable 402, as it passes from the first coil 404 to the second coil 406 as facilitated by the guide wheel 122, in effect twists or rotates the cable in relatively small increments for a given length of the cable 402. The cumulative effect of this twist is the overall rotation between the rotating spool 104 and the stationary spool 108.

Figure 5:
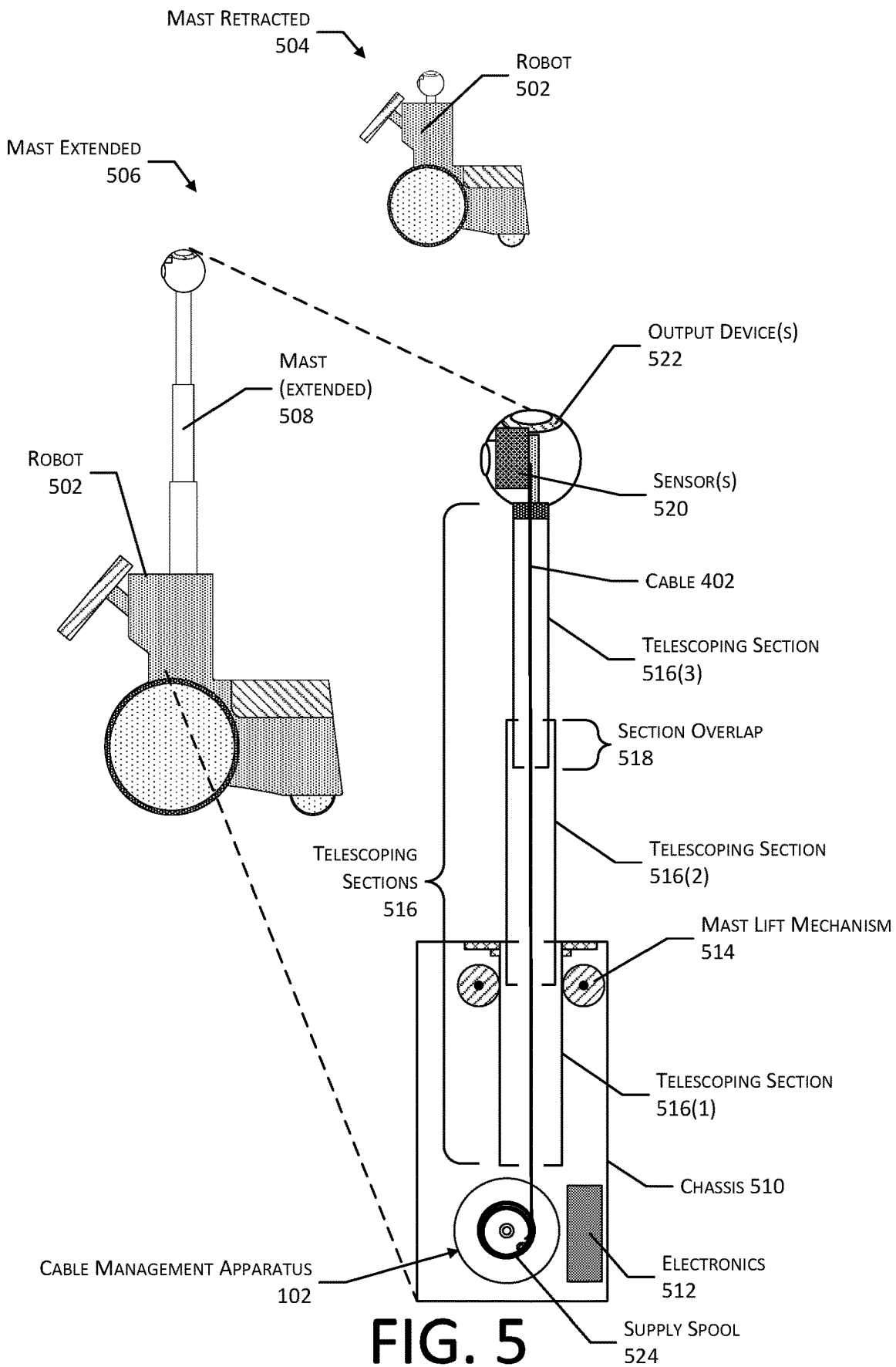
FIG. 5 illustrates a view of a robot with an extensible mast which uses the cable rotation apparatus, according to some implementations.

FIG. 5 illustrates a view of a robot 502 including a view with an extendable mast retracted 504 and extended 506. The mast 508 may utilize a strip, hydraulics, pneumatics, rack and pinion, and so forth to provide a lifting force, retraction force, or both.

A chassis 510 provides a structure for the mounting of various components of the mast 508 and the cable rotation apparatus 102. In some implementations, the chassis 510 may be part of a larger device, such as the robot 502.

Electronics 512 may be located internally or externally to the chassis 510. The electronics 512 may provide a signal to operate a mast lift mechanism 514. For example, the electronics 512 may drive one or more actuators in the mast lift mechanism 514 that extend or retract the mast 508.

In some implementations, the mast 508 may comprise a plurality of telescoping sections 516. These telescoping sections 516 may be configured to fit at least partially within one another. For example, a first telescoping section 516(1) may have a first inner diameter which is larger than an outer diameter of a second telescoping section 516(2). A third telescoping section 516(3), in turn, has an outer diameter which is less than an inner diameter of the second telescoping section 516(2). When retracted, the third telescoping section 516(3) may rest at least partially within the second telescoping section 516(2), while the second telescoping section 516(2) may rest at least partially within the first telescoping section 516(1).

When the mast 508 is fully extended, at least a portion of adjacent telescoping sections 516 overlap with one another, producing section overlap 518. For example, adjacent telescoping sections 516 may overlap by at least 100 mm. This overlap may improve the stability of the mast 508, minimize binding during extension and retraction, and so forth.

One or more of the telescoping sections 516 may comprise a rigid material. For example, the telescoping sections 516 may comprise polyvinyl chloride (PVC) plastic, acrylonitrile butadiene styrene (ABS) plastic, and so forth.

In some implementations, the telescoping sections 516 may be keyed or designed to maintain a particular orientation. For example, a ridge in one telescoping section 516 may fit within a slot of another telescoping section 516, keeping the telescoping sections 516 in the same direction with respect to the chassis 510.

In other implementations, instead of or in addition to telescoping sections 516, other structures may be used. For example, accordion-folded or pleated bellows may have a first end affixed to the chassis 510 and a second end affixed to the payload attachment piece. As a semi-rigid strip is extended or retracted, the bellows may expand and contract, raising the mast 508.

One or more of sensors 520, output devices 522, or other devices may comprise a payload that is mounted to a distal end of the mast 508. The sensors 520 may include cameras, microphones, and so forth. The output devices 522 may include lights, speakers, and so forth. As the mast 508 is extended or retracted, the height of the payload changes. For example, the robot 502 may extend the mast 508 to a height that places the sensors 520 at a height sufficient to view a tabletop.

Electrical power, communication, radio frequency signals, optical signals, and so forth may be transferred between the payload and the electronics 512 within the supporting device, such as the robot 502. As described above, a cable 402 may be used to connect the components of the payload to components in the robot 502.

As the mast 508 is extended or retracted, moving the payload, cable 402 that is stowed on a supply spool 524 may deploy or retract the cable 402. As described above, the supply spool 524 may be affixed to the rotating spool 104 such that they share the central axis 110 for rotation. As the supply spool 524 rotates to dispense or retrieve the cable 402, the cable rotation apparatus 102 transfers the length of cable 402 that is internal between the first coil 404 and the second coil 406. The cable rotation apparatus 102 provides a transition from the non-rotating end of the cable 402 that is connected to the electronics 512 and the rotating portion of the cable 402 stowed on the supply spool 524. As a result, the connection between the electronics 512 and the payload may be contiguous.

Figure 6:
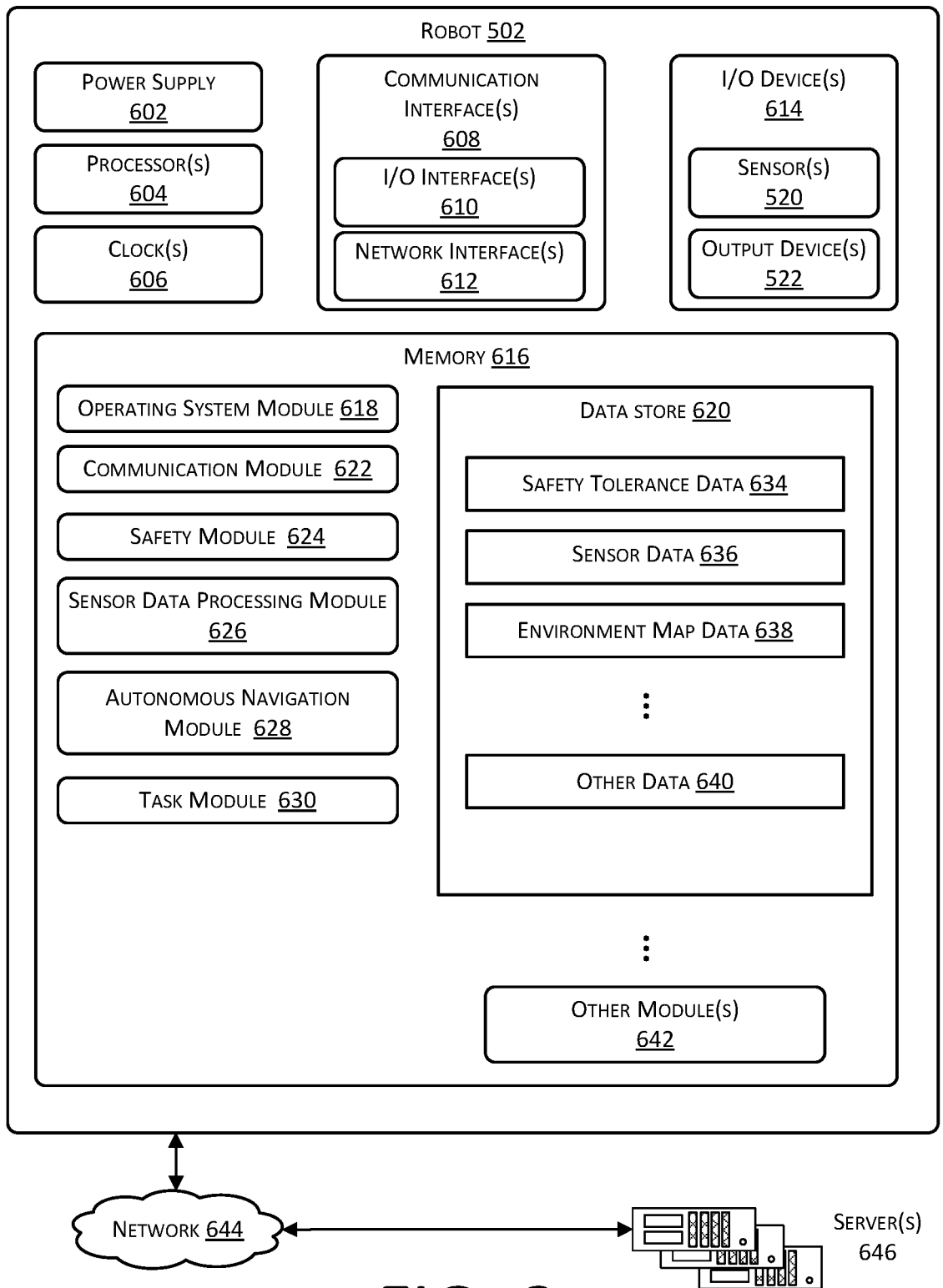
FIG. 6 is a block diagram of the components of the robot, according to some implementations.

FIG. 6 is a block diagram of the robot 502, according to some implementations.

The robot 502 may include one or more power supplies 602 to provide electrical power suitable for operating the components in the robot 502. The one or more power supplies 602 may comprise batteries, capacitors, fuel cells, photovoltaic cells, wireless power receivers, wireless power receivers, conductive couplings suitable for attachment to an external power source such as provided by an electric utility, and so forth. The robot 502 may implement multiple separate power supplies 602. For example, a first power supply may be used to provide electrical power to one or more motors of the robot 502 while a second power supply is used to provide electrical power to other electronics such as processors, communication interfaces, sensors 520, and so forth.

The robot 502 may include one or more hardware processors 604 (processors) configured to execute one or more stored instructions. The processors 604 may comprise one or more cores. The processors 604 may include microcontrollers, systems on a chip, field programmable gate arrays, digital signals processors, graphic processing units, general processing units, and so forth. One or more clocks 606 may provide information indicative of date, time, ticks, and so forth. For example, the processor 604 may use data from the clock 606 to associate a particular interaction with a particular point in time.

The robot 502 may include one or more communication interfaces 608 such as input/output (I/O) interfaces 610, network interfaces 612, and so forth. The communication interfaces 608 enable the robot 502, or components thereof, to communicate with other devices or components. The communication interfaces 608 may include one or more I/O interfaces 610. The I/O interfaces 610 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 610 may couple to one or more I/O devices 614. The I/O devices 614 may include input devices such as one or more of a sensor 520, keyboard, mouse, scanner, and so forth. The I/O devices 614 may also include output devices 522 such as one or more of a motor, light, speaker, display, projector, printer, and so forth. In some embodiments, the I/O devices 614 may be physically incorporated with the robot 502 or may be externally placed.

The network interfaces 612 may be configured to provide communications between the robot 502 and other devices such as other robots 502, a docking station, routers, access points, and so forth. The network interfaces 612 may include devices configured to couple to personal area networks (PANs), local area networks (LANs), wireless local area networks (WLANS), wide area networks (WANs), and so forth. For example, the network interfaces 612 may include devices compatible with Ethernet, Wi-Fi, Bluetooth, Bluetooth Low Energy, ZigBee, and so forth.

The robot 502 may also include one or more buses or other internal communications hardware or software that allow for the transfer of data between the various modules and components of the robot 502.

As shown in FIG. 6, the robot 502 includes one or more memories 616. The memory 616 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 616 provides storage of computer-readable instructions, data structures, program modules, and other data for the operation of the robot 502. A few example functional modules are shown stored in the memory 616, although the same functionality may alternatively be implemented in hardware, firmware, or as a system on a chip (SoC).

The memory 616 may include at least one operating system (OS) module 618. The OS module 618 is configured to manage hardware resource devices such as the I/O interfaces 610, the I/O devices 614, the communication interfaces 608, and provide various services to applications or modules executing on the processors 604. The OS module 618 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the Robot Operating System (ROS), and so forth.

Also stored in the memory 616 may be a data store 620 and one or more of the following modules. These modules may be executed as foreground applications, background tasks, daemons, and so forth. The data store 620 may use a flat file, database, linked list, tree, executable code, script, or other data structure to store information. In some implementations, the data store 620 or a portion of the data store 620 may be distributed across one or more other devices including other robots 502, servers, network attached storage devices, and so forth.

A communication module 622 may be configured to establish communication with other devices, such as other robots 502, an external server, a docking station, and so forth. The communications may be authenticated, encrypted, and so forth.

Other modules within the memory 616 may include a safety module 624, a sensor data processing module 626, an autonomous navigation module 628, task module 630, or other modules 642. The modules may access data stored within the data store 620, such as safety tolerance data 634, sensor data 636, environment map data 638, or other data 640.

The safety module 624 may access safety tolerance data 634 to determine within what tolerances the robot 502 may operate safely within the environment. For example, the safety module 624 may be configured to stop the robot 502 from moving when a carrying handle is extended. In another example, the safety tolerance data 634 may specify a minimum sound threshold which, when exceeded, stops all movement of the robot 502. Continuing this example, detection of sound such as a human yell would stop the robot 502. In another example, the safety module 624 may access safety tolerance data 634 that specifies a minimum distance from an object that the robot 502 must maintain. Continuing this example, if a sensor detects an object that approaches at less than the minimum distance, all movement of the robot 502 may be stopped. Movement of the robot 502 may be stopped by one or more of inhibiting operation of one or more of the motors, issuing a command to stop motor operation, disconnecting power from one or more of the motors, and so forth. The safety module 624 may be implemented as hardware, software, or a combination thereof.

The safety module 624 may control other factors, such as a maximum speed of the robot 502 based on information obtained by the sensors 520, precision and accuracy of the sensor data, and so forth. For example, detection of an object by an optical sensor may include some error, such as when the distance to an object comprises a weighted average between the object and a background. As a result, the maximum speed permitted by the safety module 624 may be based on one or more factors such as the weight of the robot 502, nature of the floor, distance to the object, and so forth.

The sensor data processing module 626 may access sensor data 636 that is acquired from one or more of the sensors 520. The sensor data processing module 626 may provide various processing functions such as de-noising, filtering, change detection, and so forth. Processing of sensor data 636, such as images from a camera sensor 520, may be performed by a module implementing, at least in part, one or more of the following tools or techniques. In one implementation, processing of the image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia. In another implementation, functions available in the OKAO machine vision library as promulgated by Omron Corporation of Kyoto, Japan, may be used to process the sensor data 636. In still another implementation, functions such as those in the Machine Vision Toolbox for Matlab (MVTB) available using MATLAB as developed by Math Works, Inc. of Natick, Mass., USA, may be utilized.

Techniques such as artificial neural networks (ANNs), active appearance models (AAMs), active shape models (ASMs), principal component analysis (PCA), cascade classifiers, and so forth, may also be used to process the sensor data 636 or other data. For example, the ANN may be trained using a supervised learning algorithm such that object identifiers are associated with images of particular objects within training images provided to the ANN. Once trained, the ANN may be provided with the sensor data 636 and produce output indicative of the object identifier.

The autonomous navigation module 628 provides the robot 502 with the ability to navigate within the environment without real-time human interaction. For example, the autonomous navigation module 628 may implement one or more simultaneous localization and mapping ("SLAM") techniques to determine the presence of obstacles, walls, landmarks, and so forth. The SLAM algorithms may utilize one or more of maps, algorithms, beacons, or other techniques to provide navigational data. The navigational data may then be used to determine a path which is then subsequently used to determine a set of commands that drive motors connected to wheels. For example, the autonomous navigation module 628 may access environment map data 638 during operation to determine relative location, estimate a path to a destination, and so forth.

The autonomous navigation module 628 may utilize various techniques during processing of sensor data 636. For example, image data obtained from cameras may be processed to determine one or more of corners, edges, planes, and so forth. In some implementations, corners may be detected and the coordinates of those corners may be used to produce point cloud data.

The environment map data 638 may be manually or automatically determined. Continuing the example, during a learning phase, or subsequent operation, the robot 502 may generate environment map data 638 that is indicative of locations of objects and structures such as chairs, doors, and so forth. Other data 640 may also be stored in data store 620.

The autonomous navigation module 628 may be used to move the robot 502 from a first location to a second location within the environment. This movement may be responsive to a determination made by an onboard processor 604, in response to a command received via one or more communication interfaces 608 or a sensor 520, and so forth. For example, an external server may send a command that is subsequently received using a network interface 612. This command may direct the robot 502 to proceed to a designated destination, such as "living room" or "dining room". The robot 502 may then process this command and use the autonomous navigation module 628 to determine the directions and distances associated with reaching the specified destination.

The memory 616 may store one or more task module 630. A task module 630 comprises instructions that, when executed, provide one or more functions associated with a particular task. In one example, the task may comprise a security or watchmen task in which the robot 502 travels throughout the environment looking for events that exceed predetermined thresholds. Continuing the example, if the robot 502 detects that the ambient temperature is below a minimum level, that water is present on the floor, or detects sound of broken glass, an alert may be generated. The alert may be given as an audible, visual, or electronic notification. For example, the electronic notification may involve the robot 502 transmitting data using one or more communication interfaces 608.

In another example, the task may comprise a "follow me" feature in which the robot 502 follows a user. For example, the user may participate in a video call using the robot 502. The camera on the mast 508 may be used to acquire video for transmission while the display is used to present video that is received. The robot 502 may use data from one or more sensors 520 to determine a location of the user relative to the robot 502, and track and follow the user. In one implementation, computer vision techniques may be used to locate the user within image data acquired by the cameras. In another implementation, the user's voice may be detected by an array of microphones, and a direction to the voice with respect to the robot 502 may be established. Other techniques may be utilized either alone or in combination to allow the robot 502 to track a user, follow a user, or track and follow a user.

In yet another example, the task may allow for the robot 502 to be summoned to a particular location. The user may utter a voice command that is heard by a microphone on the robot 502, a microphone in a smart phone, or another device with a microphone such as a network enabled speaker or television. Alternatively, the user may issue a command using an application on a smartphone, wearable device, tablet, or other computing device. Given that the location of the device at which the command was obtained is known, the robot 502 may be dispatched to that location. Alternatively, if the location is unknown, the robot 502 may search for the user.

The robot 502 may connect to a network 644 using one or more of the network interfaces 612. One or more servers 646 may provide various functions, such as automated speech recognition, natural language understanding (NLU), providing content such as audio or video to the robot 502, and so forth.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques and apparatus described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. An apparatus comprising:
a stationary spool comprising:
   a first center bore;
   a first spool gear comprising a bevel ring gear arranged around the first center bore on an inner face of the stationary spool;
   a first drum extending from a surface of the inner face of the stationary spool;
   a first aperture in the stationary spool; and
   a cable retention feature on an outer face of the stationary spool;
a rotating spool comprising:
   a second center bore;
   a second spool gear comprising a bevel ring gear arranged around the second center bore on an inner face of the rotating spool;
   a second drum extending from a surface of the inner face of the rotating spool;
   a second aperture in the rotating spool; and
   an engagement feature on an outer face of the rotating spool; and
a furling core comprising:
   a third center bore;
   a first furling gear and a second furling gear, wherein the first furling gear and the second furling gear comprise beveled gears that are arranged along a single axis of rotation that is perpendicular to a central axis extending through the first, second, and third center bores, and wherein:
      the first furling gear engages the first spool gear and the second spool gear, and
      the second furling gear engages the first spool gear and the second spool gear; and
   a guide wheel having a wheel face that extends from at least proximate to the inner face of the stationary spool to at least proximate to the inner face of the rotating spool.

2. The apparatus of claim 1, the furling core further comprising:
a first wall extending from a perimeter of a first side of the furling core towards the inner face of the stationary spool; and
a second wall extending from a perimeter of a second side of the furling core towards the inner face of the rotating spool.

3. The apparatus of claim 1, wherein the first spool gear, the second spool gear, the first furling gear, and the second furling gear comprise bevel gears having a conical pitch surface and teeth that taper towards an apex of each gear; and wherein the first spool gear and the second spool gear each have a first number of teeth and the first furling gear and the second furling gear each have a second number of teeth.

4. An apparatus comprising:
a first spool comprising:
   a first spool gear; and
   a first aperture in the first spool that extends from an inner face to an outer face of the first spool;
a second spool comprising:
   a second spool gear; and
   a second aperture in the second spool that extends from an inner face to an outer face of the second spool; and
a furling core comprising:
   a first furling gear and a second furling gear, wherein the first furling gear and the second furling gear are arranged along a single axis of rotation that is perpendicular to a central axis extending through the first spool, the second spool, and the furling core; and
wherein:
   the first furling gear engages the first spool gear and the second spool gear; and
   the second furling gear engages the first spool gear and the second spool gear.

5. The apparatus of claim 4, further comprising:
a cable having:
   a first end of the cable that passes through the first aperture from the outer face of the first spool to the inner face of the first spool,
   a first portion that is at least partially coiled proximate to the inner face of the first spool,
   a second portion that extends from the first portion to a third portion,
   the third portion is at least partially coiled proximate to the inner face of the second spool, and
   a second end of the cable that passes through the second aperture from the inner face of the second spool to the outer face of the second spool.

6. The apparatus of claim 4, the first spool further comprising a retention feature on the outer face of the first spool.

7. The apparatus of claim 4, further comprising:
a guide feature that extends from a first side of the furling core that is proximate to the inner face of the first spool to a second side of the furling core that is proximate to the inner face of the second spool, wherein the guide feature comprises a wheel having a diameter that is greater than a thickness of the furling core.

8. The apparatus of claim 4, the first spool further comprising:
a first wall extending from a surface of the inner face of the first spool that is proximate to a perimeter of the first spool gear; and
the second spool further comprising:
a second wall extending from a surface of the inner face of the second spool that is proximate to a perimeter of the second spool gear.

9. The apparatus of claim 4, wherein:
a first apex of the first furling gear is proximate to the central axis; and
a second apex of the second furling gear is proximate to the central axis.

10. The apparatus of claim 4, wherein:
the first spool gear comprises a bevel ring gear arranged around a center of the first spool on the inner face of the first spool, with an apex of the bevel ring gear proximate to the furling core; and
the second spool gear comprises a bevel ring gear arranged around a center of the second spool on the inner face of the second spool, with an apex of the bevel ring gear proximate to the furling core.

11. The apparatus of claim 4, wherein the first spool gear, the second spool gear, the first furling gear, and the second furling gear comprise straight bevel gears having a conical pitch surface and teeth that are straight and taper towards an apex of each gear.

12. The apparatus of claim 4, wherein the furling core rotates, with respect to the first spool, at a first rotational rate that is less than a second rotational rate of the second spool with respect to the first spool.

13. An apparatus comprising:
a first component comprising:
   a first gear; and
   a first aperture through the first component;

a second component comprising:
    a second gear; and
    a second aperture through the second component;
a third component comprising:
    a third gear that engages the first gear and the second gear, wherein the third gear is arranged along a first axis of rotation that is perpendicular to a second axis extending through the first component and the second component; and
a cable having:
    a first end of the cable that passes through the first aperture from an outer face of the first component to an inner face of the first component,
    a first portion that is at least partially coiled proximate to the inner face of the first component,
    a second portion that extends from the first portion to a third portion,
    the third portion is at least partially coiled proximate to an inner face of the second component, and
    a second end of the cable that passes through the second aperture from the inner face of the second component to an outer face of the second component.

14. The apparatus of claim 13, the first component further comprising a retention feature on the outer face of the first component.

15. The apparatus of claim 13, wherein the third gear comprises a beveled gear, and wherein the second axis extends through a center of the first gear and the second gear.

16. The apparatus of claim 13, wherein the third component further comprises a guide feature that extends from a first side of the third component that is proximate to the inner face of the first component to a second side of the third component that is proximate to the inner face of the second component.

17. The apparatus of claim 13, the third component further comprising:
    a first wall extending from a first side of the third component towards the inner face of the first component; and
    a second wall extending from a second side of the third component towards the inner face of the second component.

18. The apparatus of claim 13, wherein:
    the first gear comprises a first bevel ring gear arranged on the inner face of the first component, with an apex of the first bevel ring gear proximate to the third component; and
    the second gear comprises a second bevel ring gear arranged on the inner face of the second component, with an apex of the second bevel ring gear proximate to the third component.

19. The apparatus of claim 13, the third component further comprising:
    a fourth gear that engages the first gear and the second gear, wherein the fourth gear rotates with respect to the first axis of rotation.

20. The apparatus of claim 13, wherein the first gear, the second gear, and the third gear comprise straight bevel gears having a conical pitch surface and teeth that are straight and taper towards an apex of each gear.

* * * * *